（12） United States Patent
Li

(10) Patent No.: US 9,325,470 B2
(45) Date of Patent: Apr. 26, 2016

(54) METHOD AND DEVICE FOR SENDING PILOT SIGNAL

(71) Applicant: Huawei Technologies Co., Ltd., Shenzhen, Guangdong (CN)

(72) Inventor: Yuanjie Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 156 days.

(21) Appl. No.: 14/162,376

(22) Filed: Jan. 23, 2014

(65) Prior Publication Data

US 2014/0140422 A1    May 22, 2014

Related U.S. Application Data

(63) Continuation of application No. PCT/CN2012/079731, filed on Aug. 6, 2012.

(30) Foreign Application Priority Data

Aug. 5, 2011    (CN) .......................... 2011 1 0224400

(51) Int. Cl.
H04L 5/00    (2006.01)
(52) U.S. Cl.
CPC ............ H04L 5/0051 (2013.01); H04L 5/0007 (2013.01)
(58) Field of Classification Search
None
See application file for complete search history.

(56) References Cited

U.S. PATENT DOCUMENTS

| 2007/0070944 | A1* | 3/2007 | Rinne | .................. | H04B 7/0669 370/329 |
| 2010/0118743 | A1* | 5/2010 | Suo | ........................ | H04L 5/0007 370/277 |
| 2011/0205954 | A1* | 8/2011 | Gorokhov | ............. | H04L 5/0007 370/315 |
| 2011/0216842 | A1* | 9/2011 | Zhang | .................. | H04L 5/0051 375/260 |

(Continued)

FOREIGN PATENT DOCUMENTS

| CN | 1852069 A | 10/2006 |
| CN | 101677306 A | 3/2010 |

(Continued)

OTHER PUBLICATIONS

"Performance evaluation of multiple stream DRS design," 3GPP TSG-RAN Working Group 1 Meeting #56, Seoul, Korea, R1-091385, $3^{rd}$ Generation Partnership Project, Valbonne, France (Mar. 23-27, 2009).

(Continued)

Primary Examiner — Gary Mui
(74) Attorney, Agent, or Firm — Leydig, Voit & Mayer, Ltd.

(57) ABSTRACT

Embodiments of the invention disclose a method and device for sending a pilot signal. The method includes: generating a sub-frame carrying user-specific pilot signals, wherein the sub-frame includes one or more resource blocks, the resource block includes a plurality of resource elements in a symbol-subcarrier plane, locations of the resource elements in the symbol-subcarrier plane are determined by an OFDM symbol and subcarrier, a first part of the user-specific pilots signal are carried by the resource elements of the initial one or more OFDM symbols in the resource block, and a second part of the user-specific pilot signals are carried by resource elements of other OFDM symbols in the resource block; and sending the sub-frame carrying the user-specific pilot signals. The methods and devices are capable of improving the precision of channel estimation.

15 Claims, 9 Drawing Sheets

(56) References Cited

U.S. PATENT DOCUMENTS

| | | | |
|---|---|---|---|
| 2011/0249767 A1* | 10/2011 | Chen | H04L 5/0051 375/295 |
| 2011/0310825 A1* | 12/2011 | Hu | H04L 5/0017 370/329 |
| 2012/0039287 A1* | 2/2012 | Ko | H04L 5/0053 370/329 |
| 2012/0195285 A1* | 8/2012 | Ko | H04L 5/0048 370/330 |
| 2012/0195390 A1 | 8/2012 | Liu et al. | |
| 2012/0207119 A1 | 8/2012 | Zhang et al. | |

FOREIGN PATENT DOCUMENTS

| | | |
|---|---|---|
| CN | 101997810 A | 3/2011 |
| CN | 102035777 A | 4/2011 |
| CN | 102076076 A | 5/2011 |
| EP | 2501092 A1 | 9/2012 |
| WO | WO 2010148668 A1 | 12/2010 |
| WO | WO 2011017467 A2 | 2/2011 |
| WO | WO 2011032033 A2 | 3/2011 |
| WO | WO 2011062066 A1 | 5/2011 |

OTHER PUBLICATIONS

"ETSI TS 136 211—LTE; Evolved Universal Terrestrial Radio Access (E-UTRA); Physical channels and modulation (3GPP TS 36.211 version 10.2.0 Release 10)," Version 10.2.0, 3$^{rd}$ Generation Partnership Project, Valbonne, France (Jun. 2011).

* cited by examiner antenna port 7 antenna port 8

METHOD AND DEVICE FOR SENDING PILOT SIGNAL

CROSS-REFERENCE TO RELATED APPLICATIONS

This application is a continuation of International Patent Application No. PCT/CN2012/079731, filed on Aug. 6, 2012, which claims priority to Chinese Patent Application No. 201110224400.7, filed on Aug. 5, 2011, both of which are hereby incorporated by reference in their entireties.

FIELD OF TECHNOLOGY

The present invention relates to wireless communication technologies, in particular to a method and a device for sending a pilot signal.

BACKGROUND OF THE INVENTION

An increasing number of standards organizations use wireless communication systems based on an orthogonal frequency division multiplexing (Orthogonal Frequency Division Multiplexing, OFDM) technology because they can overcome inter-cell interference. In the OFDM technology, a whole frequency band is divided into a plurality of subcarriers, and user data are mapped onto the corresponding subcarriers for transmission. The data of the communication system adopting the OFDM technology is carried by different OFDM symbols and subcarriers for transmission, and a symbol-subcarrier plane is constructed by using the OFDM symbols and the subcarriers as two-dimensional coordinates.

In establishment of specifications of long term evolution advanced (LTE-A) of a next generation radio cellular mobile communication system, in order to meet the requirement of peak rate, a carrier aggregation technology is introduced. In the carrier aggregation technology, a plurality of branch carriers are aggregated and resources of a plurality of branch carriers are scheduled for the use of a terminal simultaneously. Spectra occupied by a plurality of branch carriers may be continuous or discontinuous, the bandwidths of the branch carriers may be same or different, and each branch carrier may be a carrier compatible with an LTE terminal or a carrier only supporting an LTE-A terminal.

For a carrier which only supports LTE-A, the LTE terminal cannot perform data transmission or communication on the LTE-A carrier. In the prior art, in order to support the characteristics of an LTE-A system, besides that a certain carrier may be configured into the one which only supports the LTE-A terminal, a part of Physical Resource Block (PRB) resource may also be configured in a branch carrier into the one which cannot be used by the LTE terminal.

Similar to other wireless communication systems, the wireless communication system based on the OFDM technology needs to transmit pilot signals, and these pilot signals are distributed on a time-frequency plane according to certain pilot patterns. In the prior art, the specific pilot is designed on the basis of a backward compatible LTE sub-frame structure, namely, a sub-frame contains cell-specific reference signals (Cell-specific reference signals, CRS), the first n OFDM symbols of each sub-frame are used for carrying a physical downlink control channel (PDCCH), and a physical downlink shared channel (PDSCH) for transmitting data starts from the (n+1)th OFDM symbol.

In a non-compatible carrier, because the PDCCH is not required to be transmitted, the PDSCH may start transmission from the first symbol, but the specific pilot for channel estimation is placed on the last two OFDM symbols in the first slot. A pattern of the specific pilot in a common cyclic prefix (CP) sub-frame is taken as an example, and FIG. 1-FIG. 4 show specific pilot patterns of common CP sub-frames of four different antenna ports in LTE R10 version, wherein the specific pilot appears from the 6th OFDM symbol, and PDSCH demodulation on the first 5 symbols may only be obtained by extrapolation by means of the channel estimation result on the closest 6th symbol, and thus the precision of channel estimation is affected, and the data demodulation performance is further affected.

SUMMARY OF THE INVENTION

The technical problem to be solved in the embodiments of the present invention is to provide a method and device for sending a pilot signal for improving the precision of channel estimation.

In order to solve the above technical problem, provided in the embodiments of the present invention is a method for sending a pilot signal. The method includes: generating a sub-frame which carries user-specific pilot signals, wherein the sub-frame includes one or more resource blocks, the resource block includes a plurality of resource elements in a symbol-subcarrier plane, locations of the resource elements in the symbol-subcarrier plane are determined by OFDM symbols and subcarriers, a first part of the user-specific pilot signals are carried by resource elements of the initial one or more OFDM symbols in the resource block, and a second part of the user-specific pilot signals are carried by resource elements of the other OFDM symbols in the resource block; and sending the sub-frame carrying the user-specific pilot signals.

Correspondingly, also provided in the embodiment of the present invention is a pilot signal receiving method, including: receiving a sub-frame carrying user-specific pilot signals, wherein the sub-frame includes one or more resource blocks, the resource block includes a plurality of resource elements in a symbol-subcarrier plane, locations of the resource elements in the symbol-subcarrier plane are determined by OFDM symbols and subcarriers, a first part of the user-specific pilot signals are carried by resource elements of the initial one or more OFDM symbols in the resource block, and a second part of the user-specific pilot signals are carried by resource elements of the other OFDM symbols in the resource block; and acquiring the user-specific pilot signals according to the received sub-frame.

A transmitter in a wireless communication system includes: a generating module, used for generating a sub-frame carrying user-specific pilot signals, wherein the sub-frame includes one or more resource blocks, the resource block includes a plurality of resource elements in a symbol-subcarrier plane, locations of the resource elements in the symbol-subcarrier plane are determined by OFDM symbols and subcarriers, a first part of the user-specific pilot signals are carried by resource elements of the initial one or more OFDM symbols in the resource block, and a second part of the user-specific pilot signals are carried by resource elements of the other OFDM symbols in the resource block; and a sending module, used for sending the sub-frame carrying the user-specific pilot signals.

Moreover, provided is a receiver in a wireless communication system, including: a receiving module, used for receiving a sub-frame carrying user-specific pilot signals, wherein the sub-frame includes one or more resource blocks, the resource block includes a plurality of resource elements in a symbol-subcarrier plane, locations of the resource elements in the symbol-subcarrier plane are determined by OFDM symbols and subcarriers, a first part of the user-specific pilot signals are carried by resource elements of the initial one or more OFDM symbols in the resource block, and a second part of the user-specific pilot signals are carried by resource elements of the other OFDM symbols in the resource block; and an acquiring module, used for acquiring the user-specific pilot signals according to the received sub-frame.

Moreover, provided is a wireless communication system, including at least one aforementioned transmitter and at least one aforementioned receiver.

The embodiments of the present invention have the following beneficial effects: in the embodiments of the present invention, the user-specific pilot signals are added and carried by the resource elements of the initial OFDM symbols of the resource block, the locations of the added pilot signals do not occupy the locations of the existing pilot signals, and the added pilot is spaced from the neighboring pilot as much as possible in the symbol-subcarrier plane, so that channel interpolation estimation is facilitated, and the precision of channel estimation is improved.

BRIEF DESCRIPTION OF THE DRAWINGS

In order to illustrate the technical solution in the embodiments of the present invention or the prior art more clearly, brief description will be made below to the drawings required in the embodiments of the present invention or the prior art, and apparently, the drawings described below are some embodiments of the present invention only. Other drawings could be obtained from these drawings by those ordinary skilled in this art without creative efforts.

DETAILED DESCRIPTION OF THE EMBODIMENTS

The technical solution in the embodiments of the present invention will be described clearly and fully below in conjunction with the drawings in the embodiments of the present invention, and apparently, the embodiments described are only part of embodiments of the present invention, not all of them. Based on the embodiments of the present invention, all the other embodiments acquired by ordinary skilled in this art without creative efforts shall fall within the protection scope of the present invention.

Pilot signals are carried by resource elements of initial OFDM symbols of a resource block of a sub-frame in the embodiments of the present invention, for example, pilot resources may also be carried at locations of the initial OFDM symbols of the resource block on the basis of the pilot patterns listed in FIG. 1 to FIG. 4, so on the one hand, locations of the existing pilot resources are not required to be modified, and on the other hand, pilot resources carried at the locations are favorable for improving the precision of channel estimation.

Figure 1:
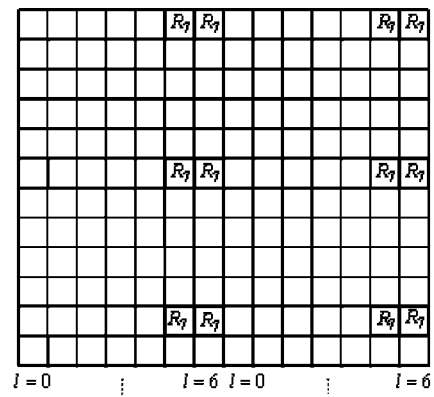
FIG. 1 shows a specific pilot pattern of a common CP sub-frame of an antenna port 7 in an existing LTE R10 version.
Figure 2:
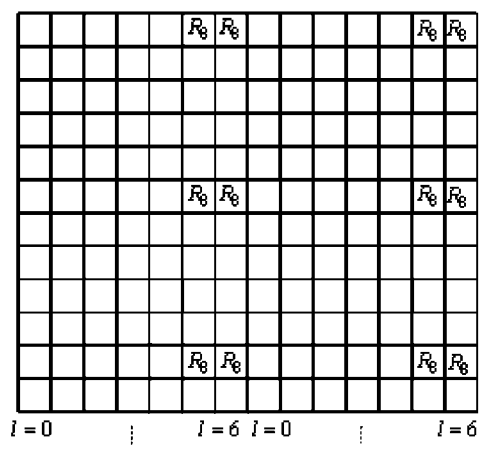
FIG. 2 shows a specific pilot pattern of a common CP sub-frame of an antenna port 8 in an existing LTE R10 version.
Figure 3:
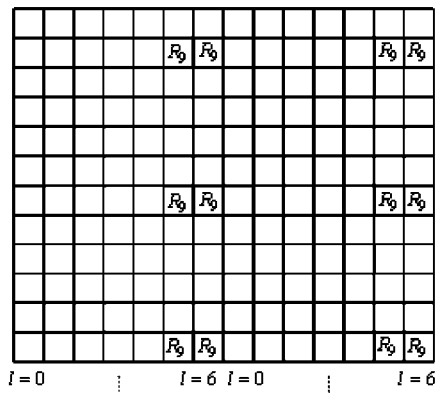
FIG. 3 shows a specific pilot pattern of a common CP sub-frame of an antenna port 9 in an existing LTE R10 version.
Figure 4:
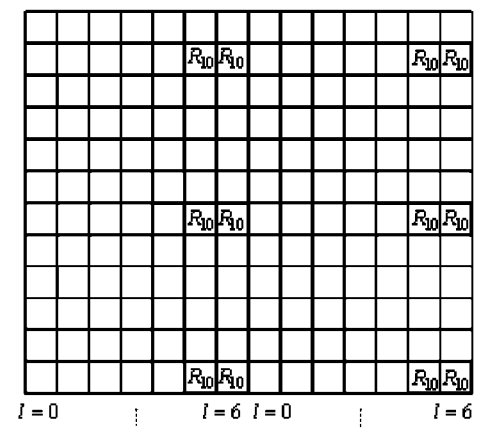
FIG. 4 shows a specific pilot pattern of a common CP sub-frame of an antenna port 10 in an existing LTE R10 version.
Figure 5:
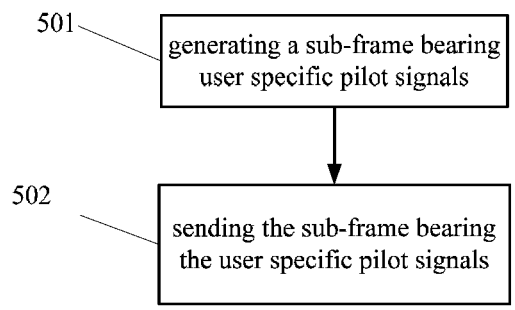
FIG. 5 is a specific flow schematic view of a method for sending a pilot signal in an embodiment of the present invention.

FIG. 5 shows a specific flow schematic view of a method for sending a pilot signal in the embodiment of the present invention. The method in the embodiment of the present invention may be applied to non-compatible carriers; and for compatible carriers, sub-frames of an LTE sub-frame structure based on backward compatibility contains cell-specific reference signals (CRS), if the first n OFDM symbols of each sub-frame are used for carrying a physical downlink control channel (Physical Downlink Control Channel, PDCCH), a physical downlink shared channel (Physical Downlink Shared Channel, PDSCH) for transmitting data starts from the (n+1)th OFDM symbol.

The pilot signal method in the embodiment of the present invention includes the following steps.

501, a sub-frame carrying user specific pilot signals is generated, wherein the sub-frame includes one or more resource blocks, the resource block includes a plurality of resource elements in a symbol-subcarrier plane, locations of the resource elements in the symbol-subcarrier plane are determined by OFDM symbols and subcarriers, a first part of the user-specific pilot signals are carried by resource elements of the initial one or more OFDM symbols in the resource block, and a second part of the user-specific pilot signals are carried by resource elements of other OFDM symbols in the resource block.

Figure 6:
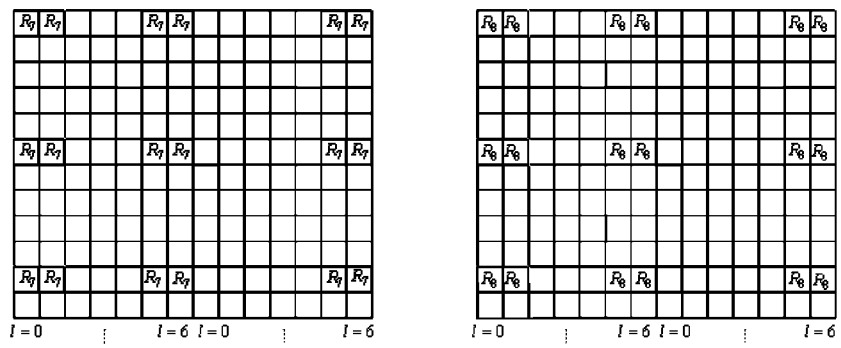
FIG. 6 shows a pilot pattern of a common CP sub-frame at antenna ports 7 and 8 in an embodiment of the present invention.

A resource block in a sub-frame sent by antenna ports 7-8, as shown in FIG. 6, has 14*12 resource blocks. In FIG. 6, transverse coordinates are OFDM symbols, and longitudinal coordinates are subcarriers.

It is determined in the embodiment of the present invention that a part of the user-specific pilot signals are carried by the resource elements of the initial one or more OFDM symbols in the resource block and other part of the user-specific pilot signals are carried by the resource elements of the other OFDM symbols in the resource block, and when specific pilot patterns (the pilot patterns denote patterns for reflecting locations of resource elements for carrying pilot in a resource block) are determined accordingly, reference may be made to the existing pilot patterns, and the carried pilot is added only at resource elements of the initial OFDM symbols on the existing pilot patterns. In this way, the existing pilot patterns are modified little as in each embodiment of FIG. 6 to FIG. 14. Of course, the pilot pattern in the embodiment of the present invention is not necessarily to be so, for example, in the embodiment of FIG. 15, besides that the pilot pattern is carried by the resource elements of the initial OFDM symbols of the resource block, the pilot pattern is only carried by the resource elements of the final OFDM symbol of the resource block.

When a part of the user-specific pilot signals are carried by the resource elements of the initial more than one OFDM symbols in the resource block, resource elements of the first OFDM symbol, second OFDM symbol or two continuous OFDM symbols starting from the initial OFDM symbols in each sub-frame resource block may be selected. Of course, according to the actual requirement, resource elements of the initial more than two OFDM symbols may also be selected for carrying the first part of the user-specific pilot signals.

As for the coordinates of subcarriers of the resource elements for carrying the pilot, it is possible that an interval of subcarriers of the resource elements for carrying the first part of the user-specific pilot signals may be the same as an interval of subcarriers of the resource elements for carrying the second part of the user-specific pilot signals. Even, it is possible that the subcarriers of the resource elements for carrying the first part of the user-specific pilot signals may be the same as the subcarriers of the resource elements for carrying the second part of the user-specific pilot signals.

Figure 7:
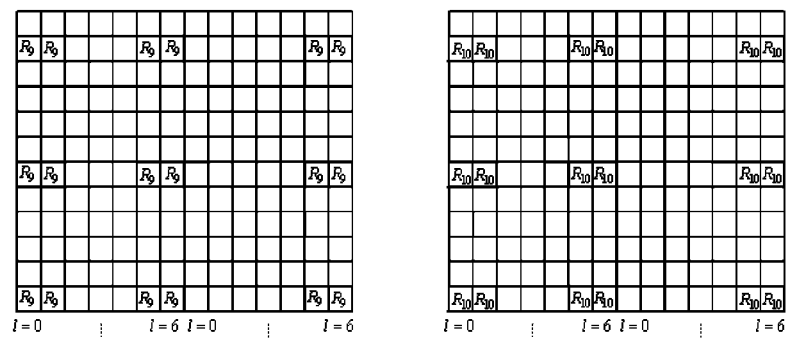
FIG. 7 shows a pilot pattern of a sub-frame with a common CP structure at antenna ports 9 and 10 in an embodiment of the present invention.
Figure 9:
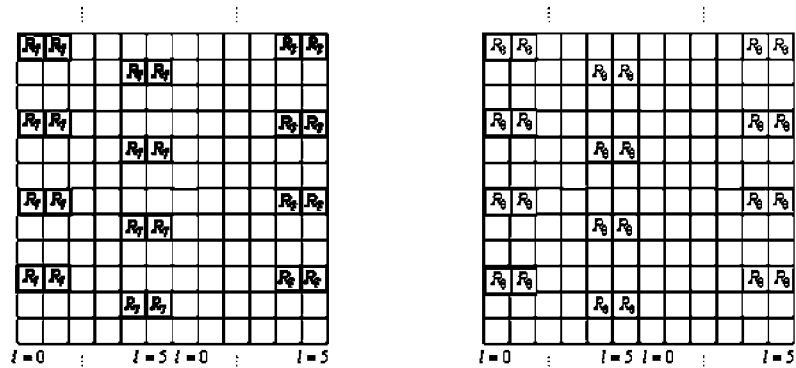
FIG. 9 shows a pilot pattern of a sub-frame with an extended CP structure at antenna ports 7 and 8 in an embodiment of the present invention.

FIG. 6 and FIG. 7 show the condition that the an interval of subcarriers of the resource elements for carrying the first part of the user-specific pilot signals are same and the subcarriers are also same, wherein the first part of the user-specific pilot signals means user-specific pilot signals in the first column and the second column (namely, the first two columns) of the resource block, and the second part of the user-specific pilot signals means user-specific pilot signals in the middle two columns and the last two columns; in FIG. 9, the subcarriers of the resource elements for carrying the first part of the user-specific pilot signals (the first part of the user-specific pilot signals means user-specific pilot signals in the first two columns of the resource block) and the second part of the user-specific pilot signals (the second part of the user-specific pilot signals means use-specific pilot signals in the middle two columns) are different, but the an interval of the subcarriers are same. In this way, in the obtained pilot patterns, locations for carrying pilot in the whole sub-frame may be more uniform, so that the precision of channel estimation is furthest improved, and the performance of data demodulation is improved.

502, a sub-frame carrying the user-specific pilot signals is sent.

In the embodiment of the present invention, when sub-frames carrying the pilot signals are sent at the different antenna ports, the pilot patterns thereof are probably same, for example, the pilot patterns of the antenna port 7 and the antenna port 8 illustrated in FIG. 6 are same. In order to enable a receiving end to distinguish pilots of different antennas, when the pilot signals are sent at a sending end, the user-specific pilot signals sent at different antenna ports are mapped by using different orthogonal codes in the sub-frames carrying the user-specific pilot signals and sent by different antenna ports, so that the receiving end can distinguish the pilots of different antennas at the same time-frequency location. In some specific embodiments of the present invention, distinguishing can be realized through different pilot patterns of different antennas, and the orthogonal codes are not required.

Namely, when the sub-frames carrying the user-specific pilot signals are sent at different antenna ports, OFDM symbols or/and subcarriers of the resource elements for carrying the user-specific pilot signals in the sub-frame sent at the first antenna port are different from OFDM symbols or/and subcarriers of the resource elements for carrying the user-specific pilot signals in the sub-frame sent at the second antenna port; or, OFDM symbols or/and subcarriers of the resource elements for carrying the first part of the user-specific pilot signals in the sub-frame sent at the first antenna port are different from the OFDM symbols or/and the subcarriers of the resource elements for carrying the first part of the user-specific pilot signals in the sub-frame sent at the second antenna port, and OFDM symbols or/and subcarriers of the resource elements for carrying the second part of the user-specific pilot signals in the sub-frame sent at the first antenna port are the same as OFDM symbols or/and subcarriers of the resource elements for carrying the second part of the user-specific pilot signals in the sub-frame sent at the second antenna port.

For example, one of the antenna port 7 and the antenna port 8 may carry pilot by using resource element of the initial first OFDM symbol of the sub-frame resource block, and the other one may carry pilot by using resource element of the initial second OFDM symbol of the sub-frame resource block. Or, the initial OFDM symbols of the resource elements for carrying pilot at the two antennas are same, but the subcarriers of the resource elements are different.

In the embodiment of the present invention, when the resource elements for carrying pilot are determined, the resource elements may be defined according to the following formulas, and the resource elements for carrying pilot, determined according to these formulas, may also include the resource elements with initial OFDM symbols.

For example, for a resource block sent at a antenna port p and having an index $n_{PRB}$, (k, l) is coordinate of a resource element in the resource block with the index $n_{PRB}$ in the symbol-subcarrier plane, wherein k denotes an index of a subcarrier, l denotes an index of an OFDM symbol, and a pilot sequence r(m) in the resource block is carried by modulation symbols $a_{k,l}^{(p)}$ of the resource elements (k, l);

when the sub-frame is a common CP sub-frame, the first part of the user-specific pilot signals carried by the resource elements of the initial one or more OFDM symbols in the resource block are denoted as:

$$a_{k,l}^{(p)} = w_p(l') \cdot r(3 \cdot l' \cdot N_{RB}^{max,DL} + 3 \cdot n_{PRB} + m')$$

wherein, $$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = l' \bmod 2$$

l'=4, 5 if $n_s$ mod 2=0, and not belong to a special sub-frame of TDD configuration 1, 2, 6 or 7, m'=0, 1, 2, when the sub-frame is an extended CP sub-frame, the resource elements for carrying the first part of the user-specific pilot signals may be denoted as:

$$a_{k,l}^{(p)} = w_p(l') \cdot r(4 \cdot l' \cdot N_{RB}^{max,DL} + 4 \cdot n_{PRB} + m')$$

wherein $$w_p(i) = \begin{cases} \overline{w}_p(i) & m' \bmod 2 = 0 \\ \overline{w}_p(1-i) & m' \bmod 2 = 1 \end{cases}$$

$$k = 3m' + N_{sc}^{RB} n_{PRB} + k'$$

k'=2 if $n_s$ mod 2=0 and p ∈ {7,8}
l=l' mod 2
l'=0, 1 if $n_s$ mod 2=0
m'=0, 1, 2, 3 the sequence $\overline{w}_p(i)$ is an orthogonal sequence for distinguishing different antenna ports.

According to the aforementioned described method, described are several pilot patterns in different embodiments of the present invention respectively.

FIG. 6 to FIG. 7 show the pilot patterns (the pilot patterns of the antenna ports with smaller sequence numbers on the left in the figures) adopted when a sub-frame with a common CP structure provided by the embodiment of the present invention send signals at the antenna ports 7-10. In this embodiment, the resource elements for carrying the first part of the pilot have the same subcarriers (namely, the coordinates of the subcarriers are consistent) as the resource elements for carrying the second part of the pilot at the same antenna port. In the embodiments shown in FIG. 6 to FIG. 7, the OFDM symbols of the resource elements for carrying the first part of the user-specific pilot signals are the first and second OFDM symbols of the resource block.

Figure 8:
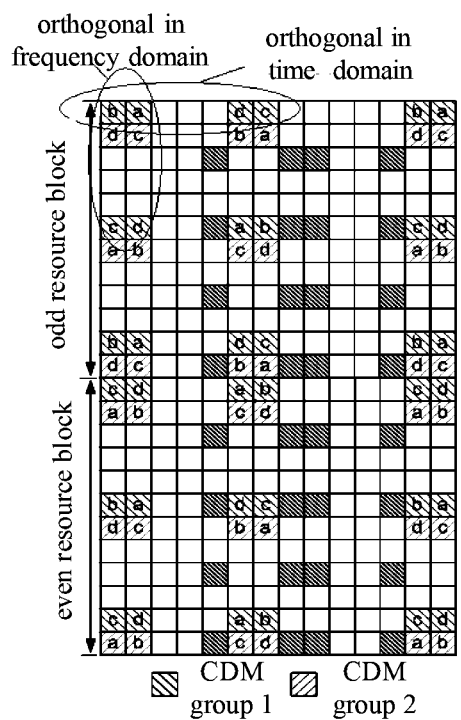
FIG. 8 is a schematic view of orthogonal code mapping of a common CP sub-frame in an embodiment of the present invention.

Mapping is performed on the pilot patterns by using orthogonal codes in the embodiment of the present invention to distinguish user-specific pilot signals of different antenna ports on the same time-frequency resource, for example, the mapped resource block as shown in FIG. 8 is obtained, and a, b, c and d in the figure are defined as formula 1.

$$W_4 = \begin{pmatrix} 1 & 1 & 1 & 1 \\ 1 & -1 & 1 & -1 \\ 1 & 1 & -1 & -1 \\ 1 & -1 & -1 & 1 \end{pmatrix} = (a \ b \ c \ d) \quad \text{Formula 1}$$

This code division design may keep the two-dimensional orthogonal property of the specific pilot on a time-frequency domain. The specific sequence on each antenna port is shown as the first two digits in the second column of Table 1.

TABLE 1

| antenna port sequence number$^p$ | $[\overline{w}_p(4) \ \overline{w}_p(5) \ \overline{w}_p(0) \ \overline{w}_p(1) \ \overline{w}_p(2) \ \overline{w}_p(3)]$ |
|---|---|
| 7 | [+1 +1 +1 +1 +1 +1] |
| 8 | [+1 −1 +1 −1 +1 −1] |
| 9 | [+1 +1 +1 +1 +1 +1] |
| 10 | [+1 −1 +1 −1 +1 −1] |
| 11 | [−1 −1 +1 +1 −1 −1] |
| 12 | [+1 +1 −1 −1 +1 +1] |
| 13 | [−1 +1 +1 −1 −1 +1] |
| 14 | [+1 −1 −1 +1 +1 −1] |

In this example, the pilot pattern may be defined according to the following formula. Namely, for a resource block sent at a antenna port p and having an index $n_{PRB}$, (k, l) is coordinate of a resource element in the resource block with the index $n_{PRB}$ in the symbol-subcarrier plane, wherein k denotes an index of a subcarrier, l denotes an index of an OFDM symbol, and the pilot sequence r(m) carried by the resource block is carried by modulation symbols $a_{k,l}^{(p)}$ of the resource elements (k, l).

The sub-frame is a common CP sub-frame, and the resource elements for carrying the first part of the user-specific pilot signals may be denoted as:

$$a_{k,l}^{(p)} = w_p(l') \cdot r(3 \cdot l' \cdot N_{RB}^{max,DL} + 3 \cdot n_{PRB} + m')$$

wherein m=3·l'·$N_{RB}^{max,DL}$+3·$n_{PRB}$+m', $$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = l' \bmod 2$$

l'=4, 5 if $n_s$ mod 2=0, and not belong to a special sub-frame of TDD configuration 1, 2, 6 or 7, m'=0, 1, 2.

The sequence $\overline{w}_p(i)$ is an orthogonal sequence for distinguishing different antenna ports. If the orthogonal sequence in Table 1 is adopted, the values of i (namely, l') in this example are 0, 1, 2, 3, 4 and 5 respectively.

FIG. 9 shows the pilot patterns (the pilot patterns of the antenna ports with smaller sequence numbers on the left in the figure) of a sub-frame with an extended CP structure at the antenna ports 7 and 8. In this embodiment, the subcarriers of the resource elements for carrying the first part of the user-specific pilot signals are different from subcarriers of the resource elements for carrying the second part of the user-specific pilot signals (namely, the second part of the user-specific pilot signals are only the pilot in the resource elements of the middle column, and the subcarriers of the resource elements for carrying the first part of the user-specific pilot signals are different from those of the closest column thereof) and are staggered at a resource element interval, and the OFDM symbols of the resource elements for carrying the first part of the user-specific pilot signals are the first and second OFDM symbols of the resource block.

Figure 10:
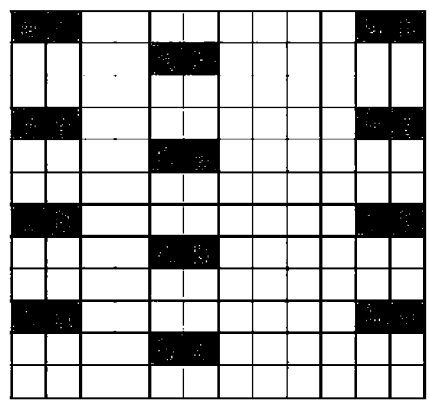
FIG. 10 shows a schematic view of orthogonal code mapping of an extended CP sub-frame in an embodiment of the present invention.

The specific pilots of different antenna ports on the same time-frequency resource are distinguished by using orthogonal codes to obtain mapped resource blocks as shown in FIG. 10, and a and b in the figure are defined as the following formula.

$$W_2 = \begin{pmatrix} 1 & 1 \\ -1 & 1 \end{pmatrix} = (a \ b)$$

The sub-frame in this example is an extended CP sub-frame, and the resource elements for carrying the first part of the user-specific pilot signals are denoted as (the meaning of each element in the formula is consistent with that in the aforementioned embodiments):

$$a_{k,l}^{(p)} = w_p(l') \cdot r(4 \cdot l' \cdot N_{RB}^{max,DL} + 4 \cdot n_{PRB} + m')$$

Wherein $$w_p(i) = \begin{cases} \overline{w}_p(i) & m' \bmod 2 = 0 \\ \overline{w}_p(1-i) & m' \bmod 2 = 1 \end{cases}$$

$$k = 3m' + N_{sc}^{RB} n_{PRB} + k'$$

k'=2 if $n_s$ mod 2=0 and p ∈ {7,8}
l=l' mod 2
l'=0, 1 if $n_s$ mod 2=0
m'=0, 1, 2, 3

The sequence $\overline{w}_p(i)$ is an orthogonal sequence for distinguishing different antenna ports. For example, the orthogonal sequence as shown in Table 2 is adopted, at this moment, the value of i may be 0 or 1.

TABLE 2

| antenna port sequence number $p$ | $[\overline{w}_p(0) \ \overline{w}_p(1)]$ |
|---|---|
| 7 | [+1 +1] |
| 8 | [−1 +1] |

Figure 11:
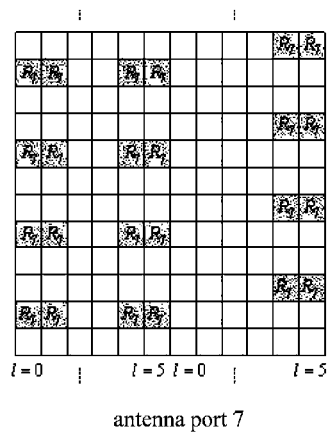
FIG. 11 shows another pilot pattern of a sub-frame with an extended CP structure at antenna ports 7 and 8 in an embodiment of the present invention.
Figure 11:
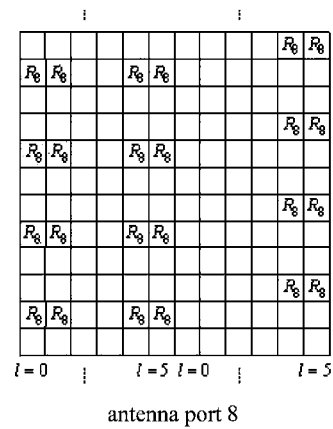
Figure 12:
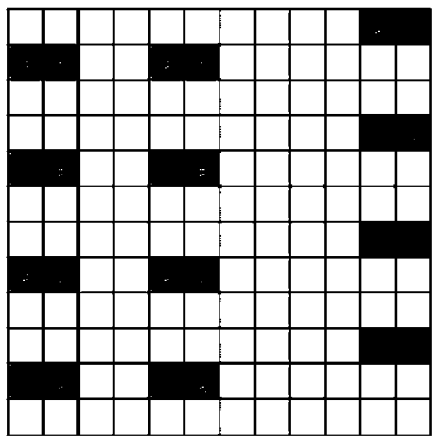
FIG. 12 is another schematic view of orthogonal code mapping of an extended CP sub-frame in an embodiment of the present invention.

FIG. 11 shows the pilot patterns (the pilot patterns of the antenna ports with smaller sequence numbers on the left in the figure) of a sub-frame with an extended CP structure at the antenna ports 7 and 8. In this embodiment, the subcarriers of the resource elements for carrying the first part of the user-specific pilot signals are the same as the subcarriers of the resource elements for carrying the second part of the user-specific pilot signals (namely, the second part of the user-specific pilot signals are only the pilot in the resource elements of the middle column, and the subcarriers of the resource elements for carrying the first part of the user-specific pilot signals are only the same as those of the closest column thereof), and the OFDM symbols of the resource elements for carrying the first part of the user-specific pilot signals are the first and second OFDM symbols of the resource block. The specific pilots of different antenna ports on the same time-frequency resource are distinguished by using orthogonal codes to obtain mapped resource blocks as shown in FIG. 12, and a and b in the figure are defined as formula 1.

Figure 13:
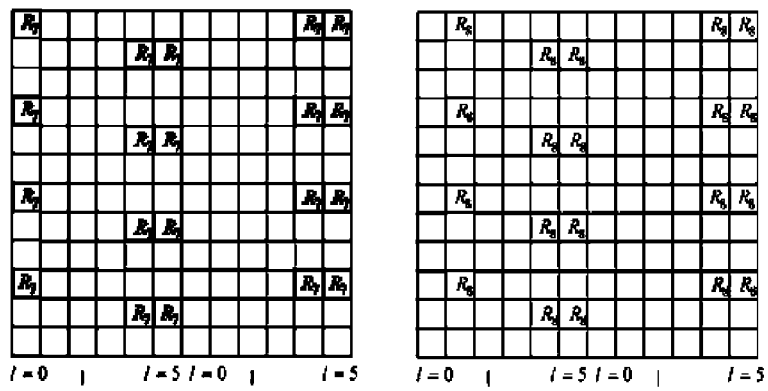
FIG. 13 shows a third pilot pattern of a sub-frame with an extended CP structure at antenna ports 7 and 8 in an embodiment of the present invention.

FIG. 13 shows the third pilot patterns of a sub-frame with an extended CP structure, and shows the specific pilot design patterns (the pilot patterns of the antenna ports with smaller sequence numbers on the left in the figure) on the antenna ports 7 and 8. In this embodiment, the OFDM symbols of the resource elements for carrying the first part of the user-specific pilot signals are the first OFDM symbol or second OFDM symbol, namely, the pilots on different antenna ports adopt a time division multiplexing (Time Division Multiplexing, TDM) mode. So, in this example, orthogonal codes for mapping are not required to be designed. Of course, in this example, the OFDM symbols of the resource elements for carrying the first part of the user-specific pilot signals on the antenna port 7 and carrying the first part of the user-specific pilot signals on the antenna port 8 may be interchanged.

Figure 14:
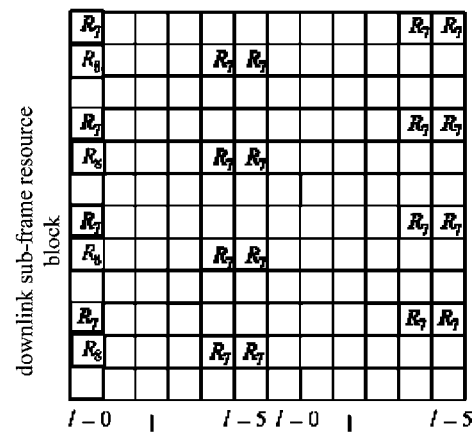
FIG. 14 shows a third fourth pilot pattern of a sub-frame with an extended CP structure at antenna ports 7 and 8 in an embodiment of the present invention.

FIG. 14 shows the fourth pilot pattern of a sub-frame with an extended CP structure, and shows the specific pilot design patterns (in the figure, the antenna ports 7 and 8 only have the difference that locations of the resource elements for carrying the first part of the user-specific pilot signals are different, and different subscripts of R represent the locations of the resource elements for carrying the first part of the user-specific pilot signals in different antenna ports) on the antenna ports 7 and 8. In this embodiment, the OFDM symbol of the resource elements for carrying the first part of the user-specific pilot signals are the first OFDM symbol, but the subcarriers of the resource elements for carrying the first part of the user-specific pilot signals are different, namely, the pilots on different antenna ports adopt a time division multiplexing (TDM) mode. So, in this example, orthogonal codes are not required to be designed for mapping. Of course, in this example, the locations of the subcarriers of the resource elements for carrying the first part of the user-specific pilot signals on the antenna port 7 and carrying the first part of the user-specific pilot signals on the antenna port 8 may be interchanged.

Figure 15:
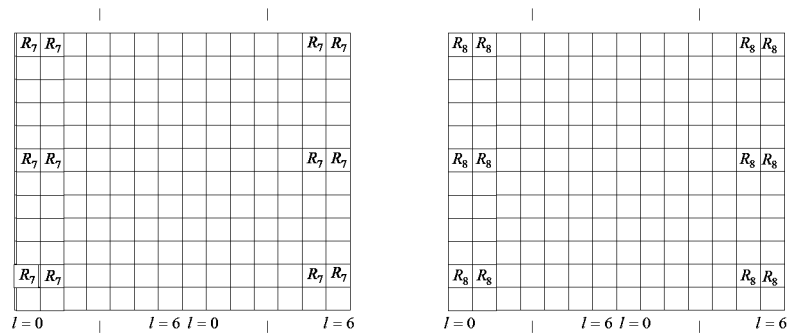
FIG. 15 shows another pilot pattern of a sub-frame with a common CP structure at antenna ports 7 and 8 in an embodiment of the present invention.
Figure 16:
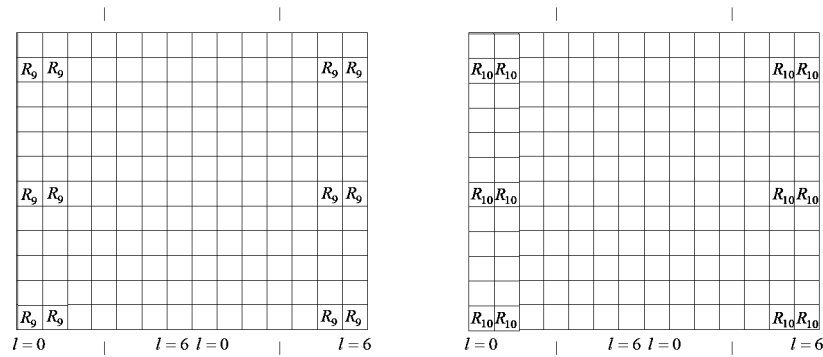
FIG. 16 shows another pilot patterns of a sub-frame with an extended CP structure at antenna ports 9 and 10 in an embodiment of the present invention.

FIG. 15 to FIG. 16 show another pilot pattern of a sub-frame with a common CP structure, and show specific pilot design patterns (the pilot patterns of the antenna ports 7 and 8 are same in the figures) on the antenna ports 7-10. In this embodiment, the OFDM symbols of the resource elements for carrying the first part of the user-specific pilot signals are the first and second OFDM symbols, and the subcarriers of the resource elements for carrying the first part of the user-specific pilot signals are the same as the subcarriers of the resource elements for carrying the second part of the user-specific pilot signals.

Figure 17:
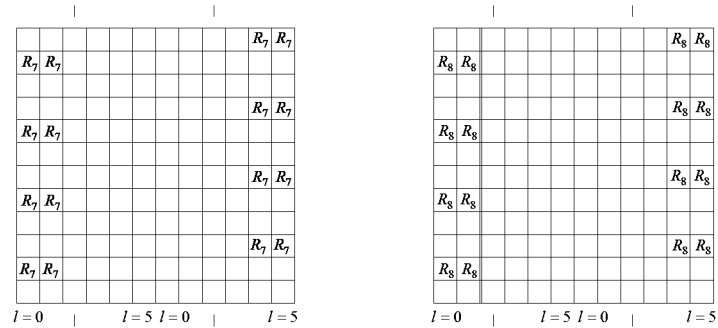
FIG. 17 shows a fifth pilot pattern of a sub-frame with an extended CP structure at antenna ports 7 and 8 in an embodiment of the present invention.

FIG. 17 shows the fifth pilot patterns of a sub-frame with an extended CP structure, and shows specific pilot design patterns (the pilot patterns of the antenna ports 7 and 8 are same in the figure) on the antenna ports 7 and 8. In this embodiment, the OFDM symbols of the resource elements for carrying the first part of the user-specific pilot signals are the first and second OFDM symbols, the subcarriers of the resource elements for carrying the first part of the user-specific pilot signals are different from subcarriers of the resource elements for carrying the second part of the user-specific pilot signals, but the intervals thereof are same.

Based on each embodiment described above, it shall be easily understood that, more different pilot patterns may also be designed according to the method provided by the present invention, and these pilot patterns should fall within the scope protected by the embodiments of the present invention and are not repeated one by one here.

Figure 18:
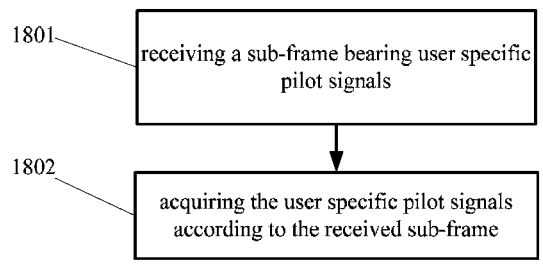
FIG. 18 is a specific flow schematic view of pilot signal receiving method in an embodiment of the present invention.

Correspondingly, also provided in the embodiments of the present invention is a pilot signal receiving method, as shown in FIG. 18, and the method includes the following steps.

1801, a sub-frame carrying user-specific pilot signals is received, wherein the sub-frame includes one or more resource blocks, the resource block includes a plurality of resource elements in a symbol-subcarrier plane, locations of the resource elements in the symbol-subcarrier plane are determined by OFDM symbols and subcarriers, a first part of user-specific pilot signals are carried by the resource elements of the initial one or more OFDM symbols in the resource block, and a second part of the user-specific pilot signals are carried by the resource elements of the other OFDM symbols in the resource block; and

1802, the user-specific pilot signals are acquired according to the received sub-frame.

The locations of the resource elements for carrying the user-specific pilot signals in this embodiment are similar to those of the aforementioned embodiments. For example, the resource elements of the initial one or more OFDM symbols in the resource block include the resource elements of the initial first OFDM symbol, second OFDM symbol or two continuous OFDM symbols in the resource block. An interval of subcarrier of the resource elements for carrying the first part of the user-specific pilot signals may be the same as an interval of subcarrier of the resource elements for carrying the second part of the user-specific pilot signals. Even, the subcarriers of the resource elements for carrying the first part of the user-specific pilot signals are also the same as subcarriers of the resource elements for carrying the second part of the user-specific pilot signals.

On the other hand, the receiving the sub-frame carrying the user-specific pilot signals may include:

receiving the sub-frame carrying the user-specific pilot signals, which is sent at a first antenna port and a second antenna port;

wherein OFDM symbols or/and subcarriers of the resource elements for carrying the user-specific pilot signals in the sub-frame sent at the first antenna port are different from OFDM symbols or/and subcarriers of the resource elements for carrying the user-specific pilot signals in the sub-frame sent at the second antenna port; or, OFDM symbols or/and subcarriers of the resource elements for carrying the first part of the user-specific pilot signals in the sub-frame sent at the first antenna port are different from OFDM symbols or/and subcarriers of the resource elements for carrying the first part of the user-specific pilot signals in the sub-frame sent at the second antenna port, and OFDM symbols or/and subcarriers of the resource elements for carrying the second part of the user-specific pilot signals in the sub-frame sent at the first antenna port are the same as OFDM symbols or/and subcarriers of the resource elements for carrying the second part of the user-specific pilot signals in the sub-frame sent at the second antenna port.

Or the step includes: receiving the sub-frame carrying the user-specific pilot signals, which is sent at the first antenna port and the second antenna port, wherein locations of the resource elements for carrying the user-specific pilot signals in the sub-frame sent at the first antenna port are the same as locations of the resource elements for carrying the user-specific pilot signals in the sub-frame sent at the second antenna port; and the user-specific pilot signals sent at the first antenna port and the second antenna port are mapped by using different orthogonal codes.

The ordinary skilled in the art should understand that this embodiment may be used for receiving the user-specific pilot patterns shown in FIG. 6 to FIG. 17, so repeated descriptions one by one are omitted here.

Figure 19:
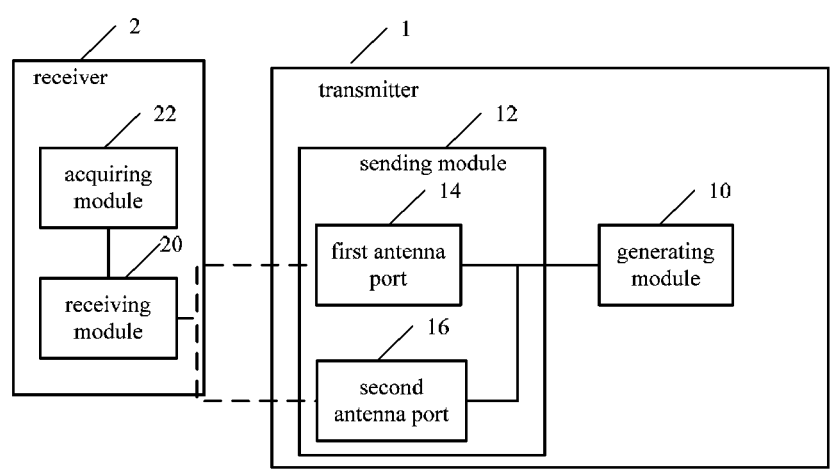
FIG. 19 is a specific composition schematic view of a wireless communication system in an embodiment of the present invention.

As shown in FIG. 19, a wireless communication system in the embodiments of the present invention may include a transmitter 1 and a receiver 2. The transmitter 1 includes: a generating module 10, used for generating a sub-frame carrying user-specific pilot signals, wherein the sub-frame includes one or more resource blocks, the resource block includes a plurality of resource elements in a symbol-subcarrier plane, locations of the resource elements in the symbol-subcarrier plane are determined by OFDM symbols and subcarriers, a first part of the user-specific pilot signals are carried by resource elements of the initial one or more OFDM symbols in the resource block, and a second part of the user-specific pilot signals are carried by the resource elements of other OFDM symbols in the resource block; and a sending module 12, used for sending the sub-frame carrying the user-specific pilot signals.

In the sub-frame generated by the generating module, an interval of subcarrier of the resource elements for carrying the first part of the user-specific pilot signals are the same as those of the resource elements for carrying the second part of the user-specific pilot signals. Or, the subcarriers of the resource elements for carrying the first part of the user-specific pilot signals are the same as subcarriers of the resource elements for carrying the second part of the user-specific pilot signals.

Meanwhile, the sending module 12 may also include a first antenna port 120 and a second antenna port 122; in the sub-frame generated by the generating module 10, OFDM symbols or/and subcarriers of the resource elements for carrying the user-specific pilot signals in the sub-frame sent at the first antenna port are different from OFDM symbols or/and subcarriers of the resource elements for carrying the user-specific pilot signals in the sub-frame sent at the second antenna port; or, OFDM symbols or/and subcarriers of the resource elements for carrying the first part of the user-specific pilot signals in the sub-frame sent at the first antenna port are different from OFDM symbols or/and subcarriers of the resource elements for carrying the first part of the user-specific pilot signals in the sub-frame sent at the second antenna port, and OFDM symbols or/and subcarriers of the resource elements for carrying the second part of the user-specific pilot signals in the sub-frame sent at the first antenna port are the same as OFDM symbols or/and subcarriers of the resource elements for carrying the second part of the user-specific pilot signals in the sub-frame sent at the second antenna port.

Or, the first antenna port and the second antenna port are used for sending the sub-frame carrying the user-specific pilot signals;

wherein locations of the resource elements for carrying the user-specific pilot signals in the sub-frame sent at the first antenna port are the same as locations of the resource elements for carrying the user-specific pilot signals in the sub-frame sent at the second antenna port; and the user-specific pilot signals sent at the first antenna port and the second antenna port are mapped by using different orthogonal codes.

The receiver 2 includes: a receiving module 20, used for receiving a sub-frame carrying user-specific pilot signals, wherein the sub-frame includes one or more resource blocks, the resource block includes a plurality of resource elements in a symbol-subcarrier plane, locations of the resource elements in the symbol-subcarrier plane are determined by OFDM symbols and subcarriers, a first part of the user-specific pilot signals are carried by the resource elements of the initial one or more OFDM symbols in the resource block, and a second part of the user-specific pilot signals are carried by the resource elements of the other OFDM symbols in the resource block; and an acquiring module 22, used for acquiring the user-specific pilot signals according to the received sub-frame.

In the sub-frame received by the receiving module 20, an interval of subcarriers of the resource elements for carrying the first part of the user-specific pilot signals are the same as an interval of subcarriers of the resource elements for carrying the second part of the user-specific pilot signals.

Or, the receiving module 20 is further used for receiving the sub-frame carrying the user-specific pilot signals, which is sent at a first antenna port and a second antenna port, wherein OFDM symbols or/and subcarriers of the resource elements for carrying the user-specific pilot signals in the sub-frame sent at the first antenna port are different from OFDM symbols or/and subcarriers of the resource elements for carrying the user-specific pilot signals in the sub-frame sent at the second antenna port; or, the OFDM symbols or/and the subcarriers of the resource elements for carrying the first part of the user-specific pilot signals in the sub-frame sent at the first antenna port are different from OFDM symbols or/and subcarriers of the resource elements for carrying the first part of the user-specific pilot signals in the sub-frame sent at the second antenna port, and OFDM symbols or/and subcarriers of the resource elements for carrying the second part of the user-specific pilot signals in the sub-frame sent at the first antenna port are the same as OFDM symbols or/and subcarriers of the resource elements for carrying the second part of the user-specific pilot signals in the sub-frame sent at the second antenna port.

Or, locations of the resource elements for carrying the user-specific pilot signals in the sub-frame sent at the first antenna port are the same as locations of the resource elements for carrying the user-specific pilot signals in the sub-frame sent at the second antenna port; and the user-specific pilot signals sent at the first antenna port and the user-specific pilot signals sent at the second antenna port are mapped by using different orthogonal codes.

Those ordinary skilled in the art should understand that, the transmitter 1 may be used for sending the user-specific pilot patterns shown in FIG. 6 to FIG. 17, the receiver 2 may be used for receiving the user-specific pilot patterns shown in FIG. 6 to FIG. 17, for simplicity, repeated description is omitted here.

In the embodiments of the present invention, the user-specific pilot signals are added and carried by the resource elements of the initial OFDM symbols of the resource block, the locations of the new added pilot signals do not occupy the locations of the existing pilot signals, and the new added pilot is spaced from the neighboring pilot as much as possible in the symbol-subcarrier plane, so that channel interpolation estimation is facilitated, and the precision of channel estimation is improved.

Those ordinary skilled in the art should understand that all of or part of the flows in the methods of the aforementioned embodiments may be completed by instructing related hardware through computer programs, the programs may be stored in a computer-readable storage medium, and when the programs are executed, the flows of the embodiments of each aforementioned method may be included, wherein the storage medium may be disk, optical disk, read-only memory (ROM) or random access memory (RAM) and the like.

The description above is only the preferred embodiments of the present invention, but not to limit the protection scope of the present invention, so equivalent variations made according to the claims of the present invention are still encompassed in the scope of the present invention.

What is claimed is:

1. A method for sending a pilot signal, comprising:
generating a resource block carrying user-specific pilot signals; and
sending the user-specific pilot signals;
wherein the resource block comprises a plurality of resource elements in a symbol-subcarrier plane,
wherein locations of the resource elements in the symbol-subcarrier plane are determined by Orthogonal Frequency Division Multiplexing (OFDM) symbols and subcarriers,
wherein a first part of the user-specific pilot signals of an antenna port are carried by resource elements occupying an initial first OFDM symbol and a second OFDM symbol in the resource block, and
wherein a second part of the user-specific pilot signals are carried by resource elements occupying OFDM symbols in the resource block other than the initial first OFDM symbol and the second OFDM symbol.

2. The method of claim 1,
wherein an interval of subcarriers occupied by the resource elements for carrying the first part of the user-specific pilot signals is the same as interval of subcarriers occupied by the resource elements for carrying the second part of the user-specific pilot signals.

3. The method of claim 1,
wherein the subcarriers occupied by the resource elements for carrying the first part of the user-specific pilot signals are the same as subcarriers occupied by the resource elements for carrying the second part of the user-specific pilot signals.

4. The method of claim 1,
wherein the sending the user-specific pilot signals comprises:
sending the user-specific pilot signals at a first antenna port and at a second antenna port,
wherein one of the following conditions is met:
any OFDM symbols and subcarriers occupied by the resource elements for carrying the user-specific pilot signals sent at the first antenna port are different from any OFDM symbols and subcarriers occupied by the resource elements for carrying the user-specific pilot signals sent at the second antenna port, and
any OFDM symbols and subcarriers occupied by the resource elements for carrying the first part of the user-specific pilot signals sent at the first antenna port are different from any OFDM symbols and subcarriers occupied by the resource elements for carrying the first part of the user-specific pilot signals sent at the second antenna port, and any OFDM symbols and subcarriers occupied by the resource elements for carrying the second part of the user-specific pilot signals sent at the first antenna port are the same as OFDM symbols and subcarriers occupied by the resource elements for carrying the second part of the user-specific pilot signals sent at the second antenna port.

5. The method of claim 1,
wherein sending the sub-frame carrying the user-specific pilot signals comprises:
sending the sub-frame carrying the user-specific pilot signals at a first antenna port and a second antenna port,
wherein locations of the resource elements for carrying the user-specific pilot signals sent at the first antenna port are the same as locations of the resource elements for carrying the user-specific pilot signals sent at the second antenna port; and
wherein the user-specific pilot signals sent at the first antenna port and the user-specific pilot signals sent at the second antenna port are mapped by using different orthogonal codes.

6. A method for receiving a pilot signal, comprising:
receiving a resource block carrying user-specific pilot signals; and
acquiring the user-specific pilot signals;
wherein the resource block comprises a plurality of resource elements in a symbol subcarrier plane, wherein locations of the resource elements in the symbol subcarrier plane are determined by Orthogonal Frequency Division Multiplexing (OFDM) symbols and subcarriers, wherein a first part of the user-specific pilot signals of an antenna port are carried by resource elements occupying an initial first OFDM symbol and a second OFDM symbol, and wherein a second part of the user-specific pilot signals are carried by resource elements occupying OFDM symbols in the resource block other than the initial first OFDM symbol and the second OFDM symbol.

7. The method of claim 6,
wherein an interval of subcarriers occupied by the resource elements for carrying the first part of the user-specific pilot signals is the same as interval of subcarriers occupied by the resource elements for carrying the second part of the user-specific pilot signals.

8. The method of claim 6,
wherein the subcarriers occupied by the resource elements for carrying the first part of the user-specific pilot signals are the same as subcarriers occupied by the resource elements for carrying the second part of the user-specific pilot signals.

9. The method of claim 6,
wherein the acquiring the user-specific pilot signals comprises:
receiving the user-specific pilot signals sent at a first antenna port and a second antenna port;
wherein one of the following conditions is met:
any OFDM symbols and subcarriers occupied by the resource elements for carrying the user-specific pilot signals sent at the first antenna port are different from OFDM symbols and subcarriers occupied by the resource elements for carrying the user-specific pilot signals sent at the second antenna port, and
any OFDM symbols and subcarriers occupied by the resource elements for carrying the first part of the user-specific pilot signals sent at the first antenna port are different from OFDM symbols and subcarriers occupied by the resource elements for carrying the first part of the user-specific pilot signals sent at the second antenna port, and any OFDM symbols and subcarriers occupied by the resource elements for carrying the second part of the user-specific pilot signals sent at the first antenna port are the same as OFDM symbols and subcarriers occupied by the resource elements for carrying the second part of the user-specific pilot signals sent at the second antenna port.

10. The method of claim 6,
wherein the acquiring the user-specific pilot signals comprises:
receiving the user-specific pilot signals sent at a first antenna port and a second antenna port,
wherein locations of the resource elements for carrying the user-specific pilot signals sent at the first antenna port are the same as locations of the resource elements for carrying the user-specific pilot signals sent at the second antenna port, and
wherein the user-specific pilot signals sent at the first antenna port and the user-specific pilot signals sent at the second antenna port are mapped by using different orthogonal codes.

11. A device, comprising:
a processor configured to generate a resource block carrying user-specific pilot signals; and
a transmitter configured to send the user-specific pilot signals,
wherein the resource block comprises a plurality of resource elements in a symbol-subcarrier plane,
wherein locations of the resource elements in the symbol-subcarrier plane are determined by Orthogonal Frequency Division Multiplexing (OFDM) symbols and subcarriers, and
wherein a first part of the user-specific pilot signals of an antenna port are carried by resource elements occupying an initial first OFDM symbol a second OFDM symbol and wherein a second part of the user-specific pilot signals are carried by resource elements occupying OFDM symbols in the resource block other than the initial first OFDM symbol and the second OFDM symbol.

12. The device of claim 11,
wherein an interval of subcarriers occupied by the resource elements for carrying the first part of the user-specific pilot signals is the same as interval of subcarriers occupied by the resource elements for carrying the second part of the user-specific pilot signals.

13. The device of claim 11,
wherein the subcarriers occupied by the resource elements for carrying the first part of the user-specific pilot signals are the same as subcarriers occupied by the resource elements for carrying the second part of the user-specific pilot signals.

14. A device, comprising:
a transceiver configured to receive a resource block carrying user-specific pilot signals; and
a processor configured to acquire the user-specific pilot signals;
wherein the resource block comprises a plurality of resource elements in a symbol-subcarrier plane,
wherein locations of the resource elements in the symbol-subcarrier plane are determined by Orthogonal Frequency Division Multiplexing (OFDM) symbols and subcarriers,
wherein a first part of the user-specific pilot signals of an antenna port are carried by resource elements occupying an initial first OFDM symbol and a second OFDM symbol, and
wherein a second part of the user-specific pilot signals are carried by resource elements occupying OFDM symbols in the resource block other than the initial first OFDM symbol and the second OFDM symbol.

15. The device of claim 14,
wherein the subcarriers occupied by the resource elements for carrying the first part of the user-specific pilot signals are the same as subcarriers occupied by the resource elements for carrying the second part of the user-specific pilot signals.

* * * * *